United States Patent [19]

Nawa et al.

[11] Patent Number: 5,522,668
[45] Date of Patent: Jun. 4, 1996

[54] PLASTIC CHASSIS HAVING A MOUNTING CONSTRUCTION OF A ROD-LIKE MEMBER

[75] Inventors: Ikuichiro Nawa; Koichi Shimoyama; Masafumi Ishizuki, all of Atsugi, Japan

[73] Assignee: Mitsumi Electric Co., Ltd., Tokyo, Japan

[21] Appl. No.: 384,765

[22] Filed: Feb. 7, 1995

[30] Foreign Application Priority Data

Feb. 8, 1994 [JP] Japan .......................... 6-14524

[51] Int. Cl.⁶ .................................... F16B 2/20
[52] U.S. Cl. .................. 403/256; 403/245; 403/289; 403/326; 403/24; 360/132
[58] Field of Search .............. 403/24, 256, 257, 403/253, 254, 245, 326, 329, 289, 405.1, 12; 360/132; 242/354

[56] References Cited

U.S. PATENT DOCUMENTS

| | | | |
|---|---|---|---|
| 3,312,406 | 4/1967 | Henriksen | 242/354 X |
| 3,787,134 | 1/1974 | Burr | 403/256 X |
| 4,122,985 | 10/1978 | Nelson | 360/132 X |
| 4,674,703 | 6/1987 | Falk | 360/132 X |
| 4,821,597 | 4/1989 | Marciniak et al. | 403/289 X |
| 4,847,950 | 7/1989 | Coleman | 403/326 X |
| 4,962,898 | 10/1990 | Lee | 360/132 X |
| 5,176,349 | 1/1993 | Bendorf | 403/326 X |
| 5,440,439 | 8/1995 | Rambosek et al. | 360/132 |

FOREIGN PATENT DOCUMENTS 1270540  4/1972  United Kingdom ............... 403/353

*Primary Examiner*—Kenneth J. Dorner
*Assistant Examiner*—Harry C. Kim
*Attorney, Agent, or Firm*—Michael N. Meller

[57] ABSTRACT

A plastic chassis is provided in which a shaft is fixed to the chassis even if a snap fitting integrally formed with the chassis is broken. An arm member having a claw portion is formed around a through hole formed in the chassis. A protrusion having a top surface located a predetermined distance lower than a top surface of the arm member is formed around the through hole. When the shaft is inserted into the through hole, the claw portion engages with an annular groove formed near the end of the shaft so as to fix the shaft to the chassis. When the arm member is broken, a slit washer is engaged with the annular groove so as to fix the shaft to the chassis. The slit washer is disposed on the top surface of the protrusion.

7 Claims, 4 Drawing Sheets

PLASTIC CHASSIS HAVING A MOUNTING CONSTRUCTION OF A ROD-LIKE MEMBER

BACKGROUND OF THE INVENTION

The present invention generally relates to a chassis made of plastics used for magnetic recording/reproducing apparatus, and more particularly to a plastic chassis on which a snap fitting used for mounting a rod-like member such as a shaft is integrally formed with the chassis.

In conventional video cassette tape recorders and digital audio cassette tape recorders, it is well known to mount mechanical parts, such as a cassette loading mechanism, a tape loading/unloading mechanism and a tape driving mechanism, on a chassis.

A conventional chassis is formed by aluminum diecasting because of aluminum's rigidity and light weight. In order to mount the above-mentioned mechanical parts on the chassis, a pin is press fitted to the chassis, and a metal plate having a shaft thereon is mounted on the chassis. When a shaft is directly mounted on the chassis, a means is used for fitting a snap ring on an end of the shaft which is inserted into a through hole formed on the chassis.

Accordingly, the conventional chassis has many parts and thus a complicated assembly process. Thus there is a problem that the manufacturing cost is very high.

In order to eliminate the above-mentioned problem, attempts have been made to reduce the number of parts of the chassis by forming the chassis of a plastic such as polycarbonate or ABS so as to integrally form other parts with the chassis. In the plastic chassis, a mounting member, referred to as a snap fitting, can be formed integrally with the chassis by taking advantage of the elasticity of the plastic material. Since the snap fitting can fix a shaft to the chassis by merely inserting the shaft into a hole formed on the chassis, parts such as a snap ring used for fixing the shaft to the chassis are not needed, and thus the number of parts can be reduced and the assembly process can be simplified.

FIGS. 1A, 1B and 1C show an example of a conventional snap fitting formed on a plastic chassis; FIG. 1A is a plan view of the snap fit; FIG. 1B is a cross-sectional view taken along a line B—B' of FIG. 1A; FIG. 1C is a cross-sectional view taken along a line C—C' of FIG. 1A.

As shown in FIGS. 1A, 1B and 1C, a through hole 48 is formed in a stage 41 of a chassis 40, and a snap fitting 42 is formed around the through hole 48. The snap fitting 42 comprises a pair of arm members 43 and 44 which oppose each other with the through hole 48 therebetween. Each of the arm members 43 and 44 has a cross section which allows the arm members 43 and 44 to be elastically bent in the radial direction of the through hole 48.

A claw portion 45 is formed on an end of the arm member 43, and a claw portion 46 is formed on an end of the arm member 44. The claw portions 45 and 46 oppose to each other, and protrude inwardly in the radial direction of the through hole 48. The arm members 43 and 44 support a shaft inserted therebetween by an elastic force thereof.

FIG. 2 is a view showing a use of the conventional snap fitting shown in FIGS. 1A, 1B and 1C. In FIG. 2, parts that are the same as the parts shown in FIG. 1A, 1B and 1C are given the same reference numerals.

In FIG. 2, a pinch roller assembly 51 having a pinch roller 50 is mounted on the chassis 40 via a shaft 53. One end of the shaft 53 is fixed to the pinch roller assembly 51, and the other end is inserted into the through hole 48 of the chassis 40. An annular groove 52 is formed near the one end of the shaft 53. The shaft 53 inserted into the through hole 48 is supported by the through hole 48 and the arm members 43 and 44. Since the claw portions 45 and 46 are engaged with the groove 52 when it is assembled in the chassis 40, the shaft 53 cannot move in an axial direction of the shaft 53, and thus the shaft 53 is fixed to the chassis 40.

In the above-mentioned conventional plastic chassis, the arm members 43 and 44 are integrally formed with the chassis 40, simultaneously. Since the arm members 43 and 44 are formed in a long and narrow shape to have elasticity, there is a problem in that the arm members 43 and 44 may be formed in an irregular shape when molding conditions are not properly controlled, and thus the arm members 43 and 44 having sufficient strength cannot be obtained. In such a case, the arm members 43 and 44 may be broken when the shaft 53 is inserted between the arm members 43 and 44. If the arm members 43 and 44 are broken, the pinch roller assembly 51 cannot be mounted to the chassis 40. Accordingly, there is a problem in that the plastic chassis 40, which is expensive, cannot be used as a whole, which is wasteful.

SUMMARY OF THE INVENTION

It is a general object of the present invention to provide an improved and useful plastic chassis in which the above-mentioned disadvantages are eliminated.

A more specific object of the present invention is to provide a plastic chassis having a structure in which a shaft can be easily mounted on the plastic chassis even if a snap fitting to be used for mounting the shaft to the plastic chassis and integrally formed with the chassis is broken.

In order to achieve the above-mentioned objects, there is provided according to the present invention, a plastic chassis comprising:

a main body made of plastic;

a through hole formed in the main body, a rod-like member having an annular groove formed near an end thereof being inserted into the through hole;

at least one arm member provided around the through hole, a projection being projected inwardly in a radial direction of the through hole, and being formed on an end of the arm member, the arm member extending in an axial direction of the through hole so that the arm member has an elasticity in a radial direction of the through hole, and the arm member being integrally formed with said main body; and at least one protrusion, provided around the through hole, having a top surface positioned a predetermined distance lower than a top surface of the arm member, the protrusion being integrally formed with the main body, the rod-like member being fixed to the main body, when the rod-like member is inserted into the through hole, by engaging the projection of the arm member with the annular groove formed on the rod-like member, the rod-like member being fixed to the main body, when the arm member is broken and thus removed, by engaging a slit washer with the annular groove formed on the rod-like member, the slit washer being disposed on a top surface of the protrusion.

According to the above-mentioned present invention, the rod-like member is mounted, ordinarily, on the chassis by a snap fitting comprising the arm member and the projection. If the arm member is broken for some reason, the arm member is removed from the chassis, and the rod-like member can be mounted on the chassis by using the slit washer. In this case, there is no need to apply a special machining to the chassis to prepare for the slit washer. Accordingly, wasting of the expensive plastic chassis for the reason only that the arm member is broken can be prevented, and thus the plastic chassis can be effectively used.

Other objects, features and advantages of the present invention will become more apparent from the following detailed invention when read in conjunction with the accompanying drawings.

BRIEF DESCRIPTION OF THE DRAWINGS

FIG. 1A is a plan view of the snap fitting; FIG. 1B is a cross-sectional view taken along a line B—B' of FIG. 1A; FIG. 1C is a cross-sectional view taken along a line C—C' of FIG. 1A;

FIG. 3A is a plan view of a snap fitting; FIG. 1B is a cross-sectional view taken along a line B—B' of FIG. 3A; FIG. 3C is a cross-sectional view taken along a line C—C' of FIG. 3A.

DETAILED DESCRIPTION OF THE PREFERRED EMBODIMENT

Figure 1A:
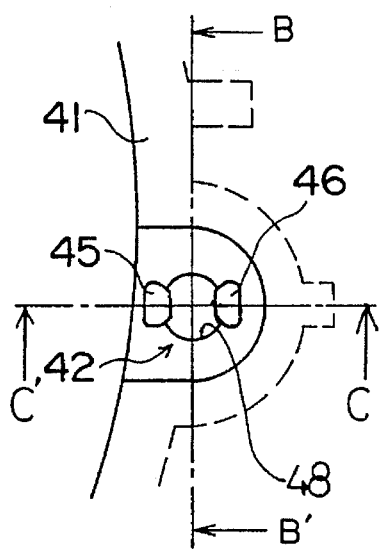
FIGS. 1A, 1B and 1C show an example of a conventional snap fitting formed on a plastic chassis.
Figure 1B:
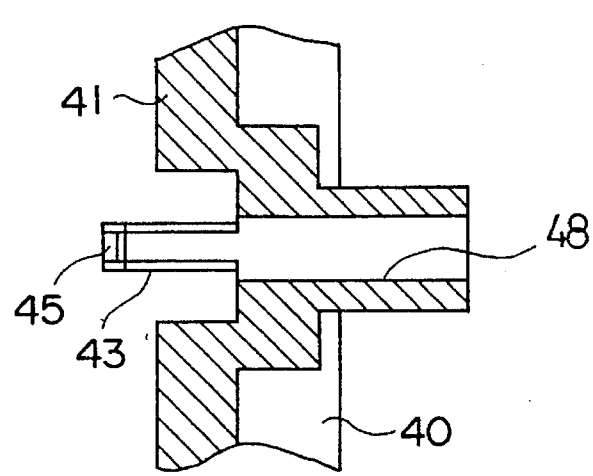
Figure 1C:
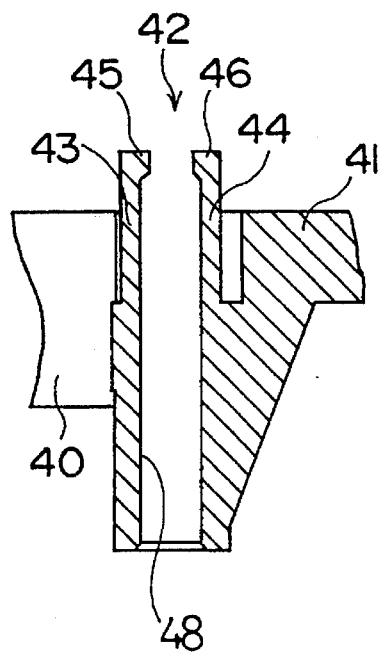
Figure 2:
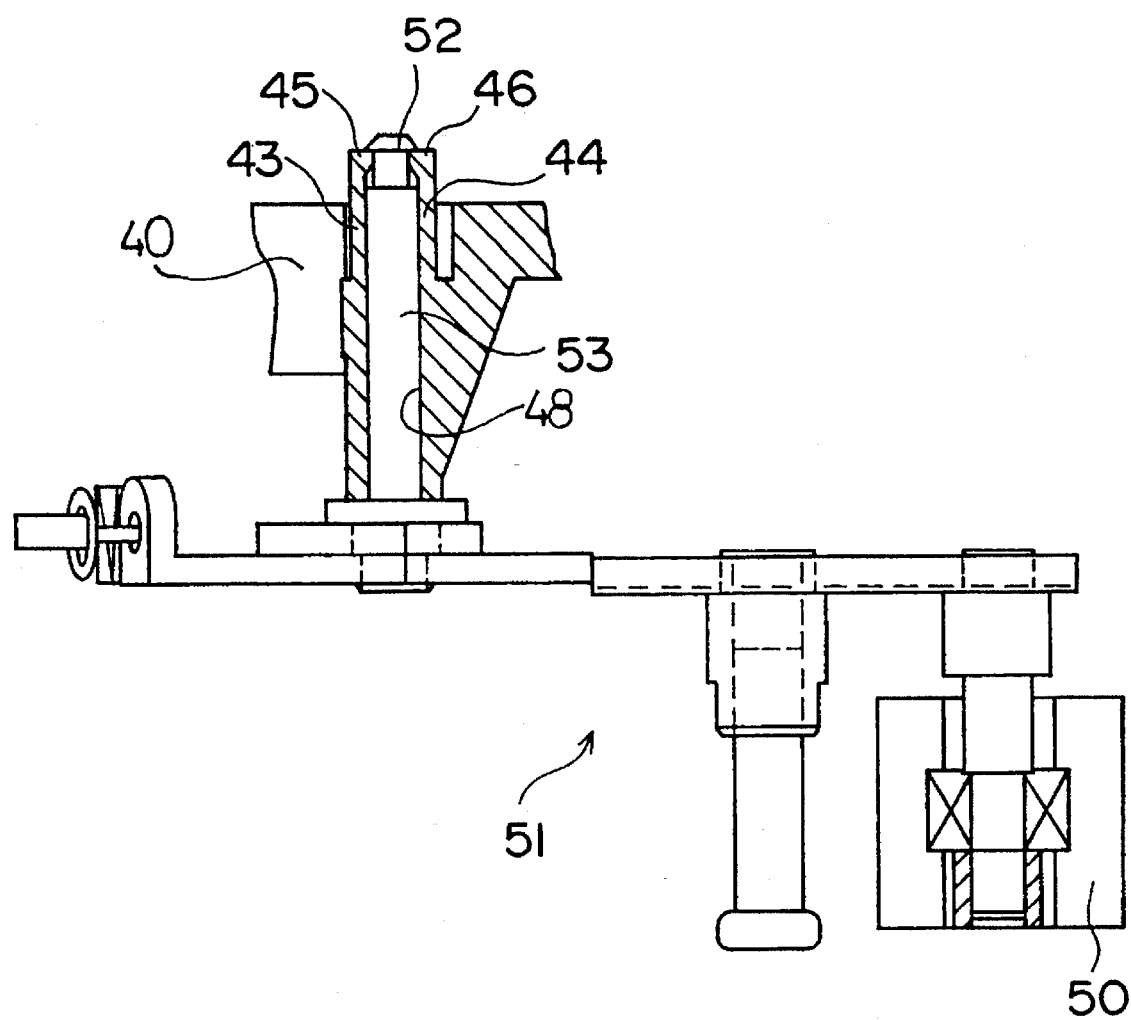
FIG.2 is a view showing a use of the conventional snap fitting shown in FIGS. 1A, 1B and 1C.
Figure 3A:
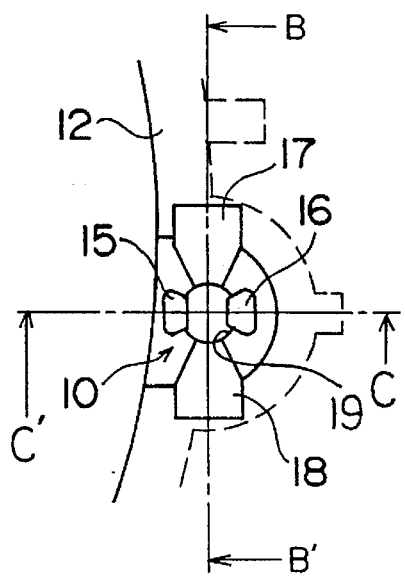
FIGS. 3A, 3B and 3C show an essential part of an embodiment of a plastic chassis according to the present invention.
Figure 3B:
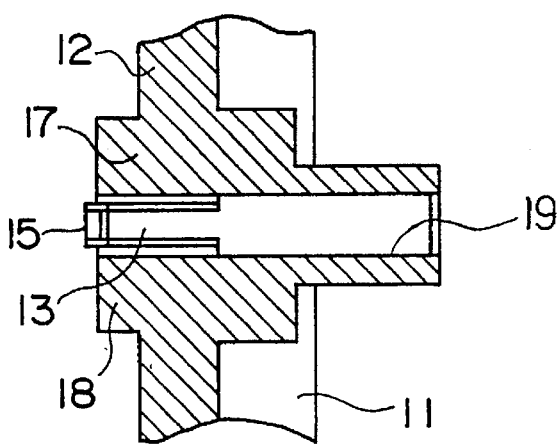
Figure 3C:
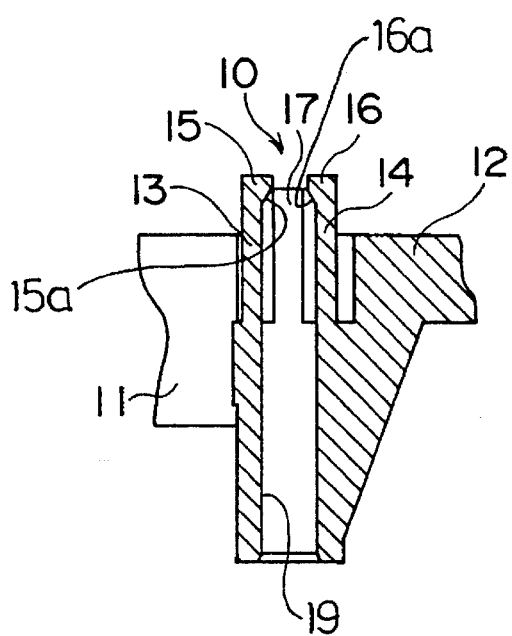

A description will now be given, with reference to FIGS. 3A, 3B and 3C, of an embodiment of a plastic chassis according to the present invention. FIGS. 3A, 3B and 3C show an essential part of an embodiment of a plastic chassis according to the present invention; FIG. 3A is a plan view of a snap fitting; FIG. 1B is a cross-sectional view taken along a line B—B' of FIG. 3A; FIG. 3C is a cross-sectional view taken along a line C—C' of FIG. 3A.

In FIGS. 3A, 3B and 3C, a chassis 11 is formed of a plastic, preferably, polycarbonate or ABS, together with a snap fitting 10 integrally formed with the chassis 11. these plastics have an elastic nature.

As shown in FIGS. 3A, 3B and 3C, a through hole 19 is formed in a stage 12 of a chassis 11, and the snap fitting 10 is formed around the through hole 19. The snap fitting 10 comprises a pair of arm members 13 and 14 which oppose each other with the through hole 19 therebetween. Each of the arm members 13 and 14 has a cross section which allows an elastic bending of the arm members 13 and 14 in the radial direction of the through hole 19.

A claw portion (projection) 15 is formed on an end of the arm member 13, and a claw portion (projection) 16 is formed on an end of the arm member 14. An inner surface of each of the arm members 13 and 14 is an extension of an inner surface of the through hole 19, that is, a part of a cylindrical surface. The claw portions 15 and 16 oppose each other, and protrude inwardly from the inner surface of each of the arm members 13 and 14 in the radial direction of the through hole 19.

Additionally, a pair of protrusions 17 and 18 are formed around the through hole 19 on the stage 12 so that the pair of protrusions 17 and 18 oppose each other with the through hole 19 therebetween. The pair of protrusions 17 and 18 are arranged in a direction perpendicular to the direction in which the arm members 13 and 14 are arranged. An inner surface of each of the protrusions 17 and 18 is an extension of an inner surface of the through hole 19, that is a part of a cylindrical surface. As shown in FIGS. 3B and 3C, a top surface of each of the protrusions 17 and 18 is at a level slightly lower than top surfaces of the claw portions 15 and 16.

The protrusions 17 and 18 are used when the arm members 13 and/or 14 does not function properly due to a breakage. That is, the top surfaces of the protrusions 17 and 18 are used when engaging a slit washer (for example an E-ring) with an end of the shaft protruding from the through hole 19, the arm members 13 and 14 being removed from the chassis.

Figure 4:
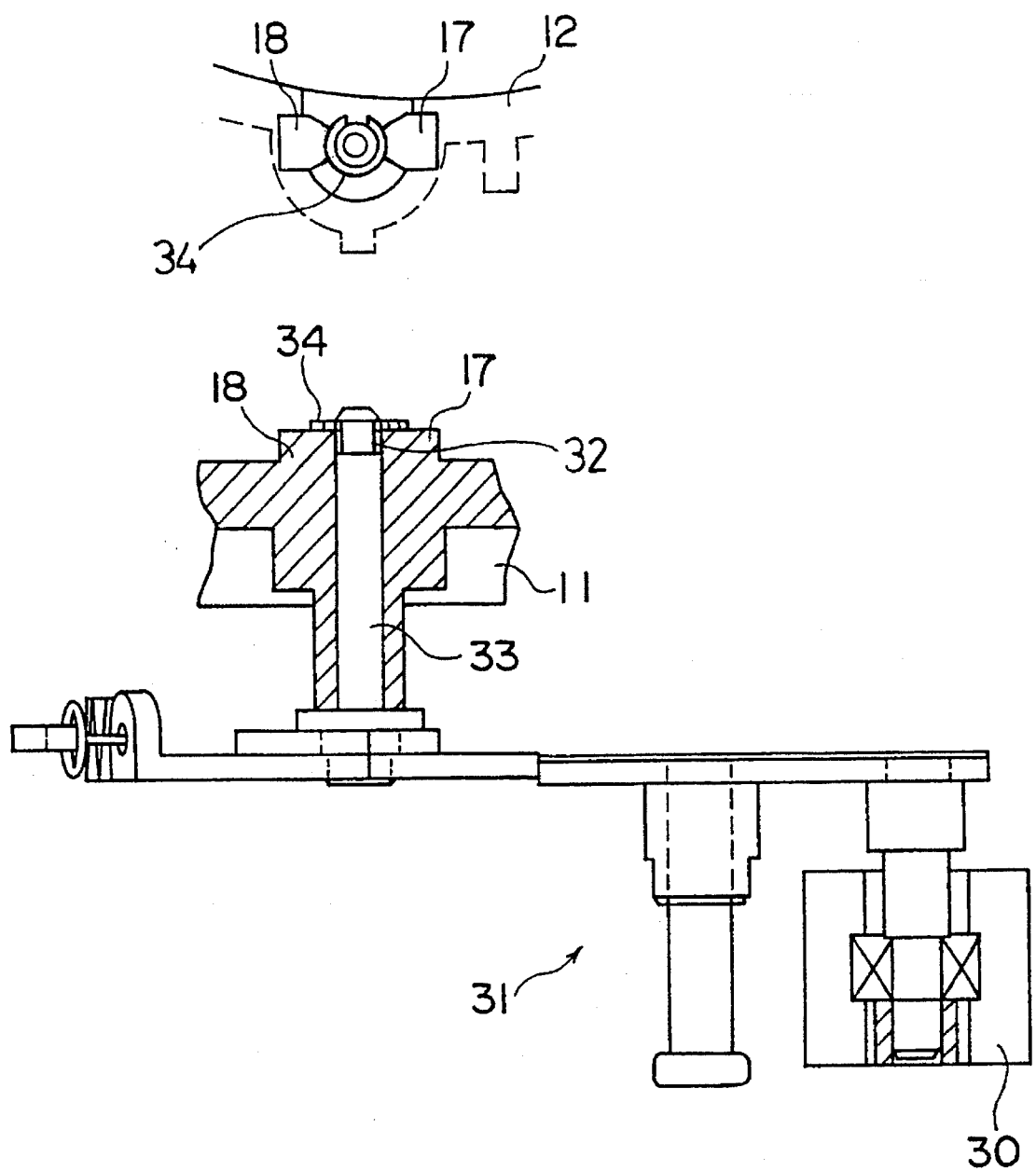
FIG. 4 is a view showing a use of the snap fitting shown in FIGS. 3A, 3B and 3C.

A description will now be given, with reference to FIG. 4, of a use of the above-mentioned embodiment. In FIG. 4, parts that are the same as the parts shown in FIGS. 3A, 3B and 3C are given the same reference numerals, and descriptions thereof will be omitted. In FIG. 4, the snap fitting 10 (the arm members 13 and 14) is not shown on the assumption that the snap fitting 10 has been removed due to breakage.

In FIG. 4, a pinch roller assembly 31 having a pinch roller 30 is mounted to the chassis 11. the pinch roller assembly 31 has a shaft 33 having an annular groove 32 formed near an end of the shaft 33. When the arm members 13 and 14 are not broken, the claw portions 15 and 16 of the arm members 13 and 14 engage with the groove 32 so as to fix the shaft 33 to the chassis 11. It should be noted that the inner surfaces of the claw portions 15 and 16 have, as shown in FIG. 3C, slopes 15a and 16a, respectively, so that an end of the shaft 33 is able to pass smoothly when it is inserted between the claw portions 15 and 16. When the end of the shaft 33 passes between the claw portions 15 and 16, the arm members 13 and 14 are bent outwardly in the radial direction of the through hole 19, and when the annular groove 32 reaches the claw portions 15 and 16, the claw portions 15 and 16 protrude into the annular groove 32. Accordingly, the shaft 33 is fixed to the chassis 11.

On the other hand, in a state where the snap fitting 10 has been removed due to breakage of the arm members 13 and/or 14 for some reason, the shaft 33 is fixed to the chassis 11 by engaging a slit washer 34 with the annular groove 32 of the shaft 33. That is, movement of the shaft 33 in the axial direction is prevented and thereby the shaft 33 is fixed to the chassis 11 by disposing the slit washer 34 between the top surfaces of the protrusions 17 and 18 and an upper inner surface of the annular groove 32.

As mentioned above, the shaft 33 can be fixed at a predetermined position by utilizing the protrusions 17 and 18 and the slit washer 34 without the snap fitting 10. Accordingly, the plastic chassis 11 according to the present invention having a snap fitting which is broken can still be used by simply using the slit washer 34 so as to fix the shaft 33 to the chassis 11. Therefore, an expensive plastic chassis having a snap fitting which is broken and thus discarded in the prior art can be saved with this embodiment.

It should be noted that although the pair of arm members 13 and 14 is provided in the above-mentioned embodiment, only one arm member may be provided. Additionally, only one protrusion may be provided instead of the pair of the protrusions 17 and 18.

The present invention is not limited to the specifically disclosed embodiment, and variations and modifications may be made without departing from the scope of the present invention.

What is claimed is:

1. A plastic chassis comprising:

a main body made of plastic;

a through hole formed in said main body, a rod-like member having an annular groove formed near an end thereof being inserted into said through hole;

at least one arm member provided around said through hole, a projection being projected inwardly in a radial direction of said through hole, and being formed on an end of said arm member, said arm member extending in an axial direction of said through hole so that said arm member has an elasticity in the radial direction of said through hole, and said arm member being integrally formed with said main body; and at least one protrusion, provided around said through hole, having a top surface positioned a predetermined distance lower than a top surface of said arm member, said protrusion being integrally formed with said main body, said rod-like member being fixed to said main body, when said rod-like member is inserted into said through hole, by engaging said projection of said arm member with said annular groove formed on said rod-like member, said rod-like member being fixed to said main body, when said arm member is broken and thus removed, by engaging a slit washer with said annular groove formed on said rod-like member, said slit washer being disposed on the top surface of said protrusion.

2. The plastic chassis as claimed in claim 1, wherein a pair of said arm members and a pair of said protrusions are provided, said pair of said arm members opposing each other with said through hole therebetween, and said pair of said protrusions opposing each other with said through hole therebetween.

3. The plastic chassis as claimed in claim 2, wherein a direction in which said pair of said arm members is arranged is perpendicular to a direction in which said pair of said protrusions is arranged.

4. The plastic chassis as claimed in claim 1, wherein a side surface of said protrusion which side surface inwardly faces said through hole is a part of a cylindrical surface which is an extension of an inner surface of said through hole.

5. The plastic chassis as claimed in claim 1, wherein a side surface of said arm member which side surface inwardly faces said through hole is a part of a cylindrical surface which is an extension of an inner surface of said through hole.

6. The plastic chassis as claimed in claim 1, wherein a slope is formed on a lower surface of said projection so that said arm member is elastically bent when said slope is pressed by the end of said rod-like member in the axial direction of said through hole.

7. The plastic chassis as claimed in claim 1, wherein a distance between a plane including a top surface of said projection and a plane including the top surface of said protrusion is generally equal to a thickness of the slit washer.

* * * * *